(12) United States Patent
Conroy et al.

(10) Patent No.: US 7,965,946 B2
(45) Date of Patent: Jun. 21, 2011

(54) MULTICHANNEL OPTICAL TRANSPORT NETWORK SKEW CALIBRATION

(75) Inventors: Keith Conroy, Perkasie, PA (US); Omer Acikel, San Diego, CA (US); Francesco Caggioni, Winchester, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 589 days.

(21) Appl. No.: 12/169,414

(22) Filed: Jul. 8, 2008

(65) Prior Publication Data

US 2010/0008677 A1 Jan. 14, 2010

(51) Int. Cl.
*H04B 10/00* (2006.01)
(52) U.S. Cl. .................. 398/154; 398/152; 398/205
(58) Field of Classification Search .......... 398/147–149, 398/158–159, 79, 65, 202–209, 150, 172, 398/176, 183–189, 152–154
See application file for complete search history.

(56) References Cited

U.S. PATENT DOCUMENTS

2009/0317090 A1* 12/2009 Conroy et al. ............... 398/184
* cited by examiner

*Primary Examiner* — Ken N Vanderpuye
*Assistant Examiner* — Abbas Alagheband
(74) *Attorney, Agent, or Firm* — Law Office of Gerald Maliszewski; Gerald Maliszewski

(57) ABSTRACT

A system and method are provided for calibrating skew in a multichannel optical transport network (OTN) transmission device. The method accepts a pair of $2^n$-phase shift keying ($2^n$PSK) modulated signals via Ix and Qx electrical signal paths, where $n>1$. Likewise, a pair of $2^p$-PSK modulated signals are accepted via Iy and Qy electrical signal paths where $p>1$. The Ix, Qx, Iy, and Qy signals are correlated to a preamble/header portion of an OTN frame. A voltage on the Ix signal path is compared with Qx, and VO12 voltage is generated. A voltage on the Iy signal path is compared with Qy, and VO34 is generated. One of the Ix or Qx voltages is compared with one of Iy or Qy voltages to generate VOxy. Then, the VO voltages are minimized in response to adjusting time delay modules in the Ix, Qx, Iy, and Qy signals paths.

16 Claims, 4 Drawing Sheets

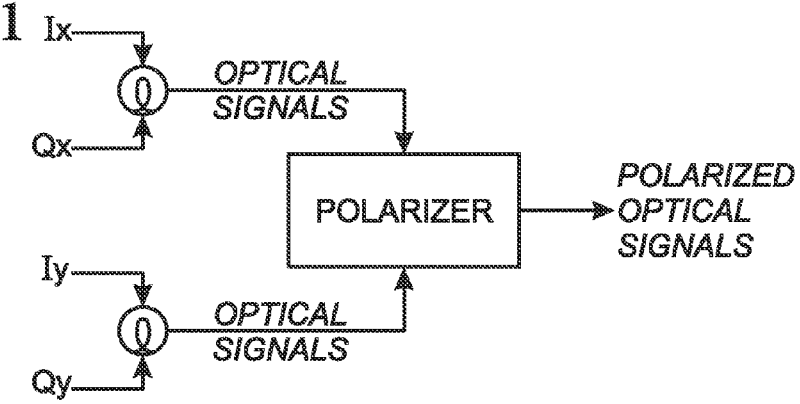
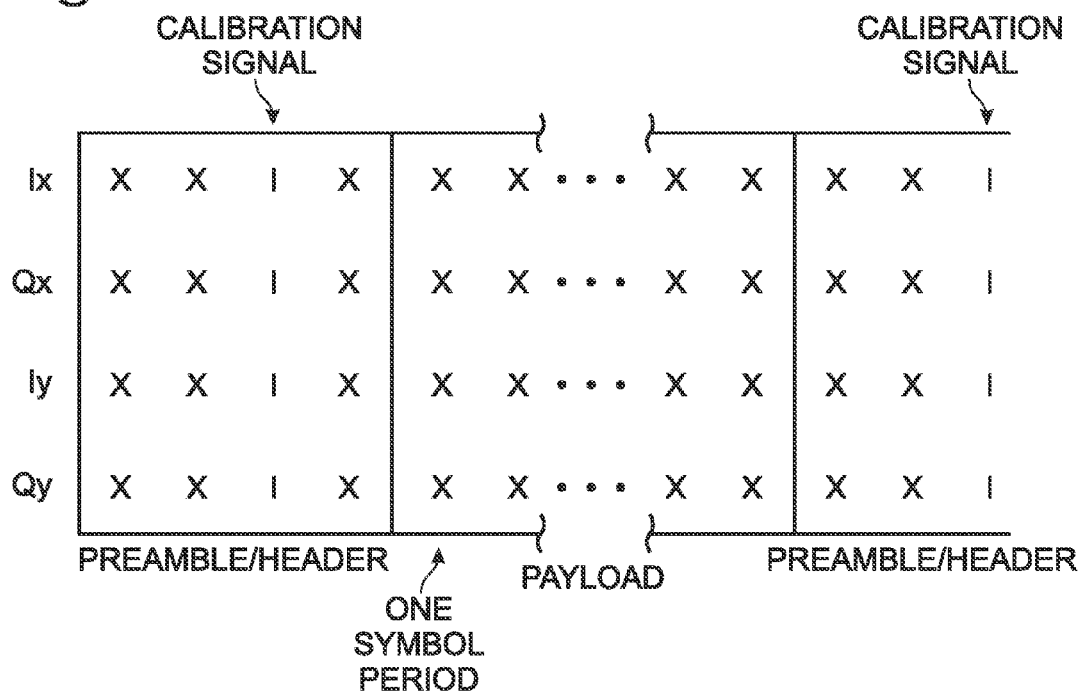

MULTICHANNEL OPTICAL TRANSPORT NETWORK SKEW CALIBRATION

BACKGROUND OF THE INVENTION

1. Field of the Invention

This invention generally relates to signal communications and, more particularly, to a system and method that uses the preamble of a multichannel Optical Transport Network (OTN) protocol signal to calibrate for skew errors.

2. Description of the Related Art 100 gigabit per second (Gbps) OTN protocols are being developed where the OTN streams are carried in a "parallel fashion" at a bit-rate greater than 100 Gbps. Until recently, optical signals have been carried using modulations techniques carrying 1 bit per symbol. However, the need for faster signal speeds means that return to zero (RZ), non-return to zero (NRZ), and phase-shift keying (PSK) modulation techniques (1 bit per symbol) are no longer suitable.

FIG. 1 is a schematic diagram depicting a system for the transmission of high speed signals (40/100 Gbps and above) using multiplexed orthogonal optical polarization, with 2 bits per symbol per polarization, for a total of 4 bits/symbol. Any skew (differential time delay) experienced in the modulation of the transmitted signal is translated to the receiver, making the recovery of a serial stream from parallel streams difficult.

It would be advantageous if a technique could be developed to minimize differential time delay or skew in the parallel pathways of a multiplexed orthogonally polarized OTN signal.

SUMMARY OF THE INVENTION

The present invention presents a system and method that address electrical skew control between complex envelope channel components, within and between polarization branches. The invention uses a predetermined signal in the preamble to calibrate for skew errors by enabling voltage measurements through each parallel path.

Accordingly, a method is provided for calibrating skew in a multichannel optical transport network (OTN) transmission device. The method accepts a pair of $2^n$-phase shift keying ($2^n$PSK) modulated signals via Ix and Qx electrical signal paths, where n>1. Likewise, a pair of $2^p$-PSK modulated signals are accepted via Iy and Qy electrical signal paths where p>1. The Ix, Qx, Iy, and Qy signals are correlated to a preamble/header portion of an OTN frame. A voltage V1 on the Ix signal path is compared with a voltage V2 on the Qx signal path, and a VO12 voltage is generated in response to the comparison. A voltage V3 on the Iy signal path is compared with a voltage V4 on the Qy signal path and a VO34 voltage is generated. Then, a voltage from one of the Ix and Qx signal paths (the first group) is compared with a voltage selected from one of the Iy and Qy signal paths (the second group), to generate a first VOxy (VOxyA) voltage. The three generated VO voltages are minimized in response to adjusting time delay modules in the Ix, Qx, Iy, and Qy signals paths. In another aspect, the three remaining unique VOxy voltages (VOxyB, VOxyC, and VOxyD), which are associated with comparing a voltage from the first group with a voltage from the second group, are calculated from the VO12, VO34, and VOxyA voltages. Then, the three generated and three calculated VO voltages are minimized in response to adjusting time delay modules in the Ix, Qx, Iy, and Qy signals paths.

The method converts the $2^n$PSK and 2PPSK signals to $2^n$PSK and 2PPSK optical signals, orthogonally polarizes the $2^n$PSK and 2PPSK optical signals, and transmits the orthogonally polarized signals.

Additional details of the above-described method and a system for calibrating skew in a multichannel OTN transmission device are described below.

BRIEF DESCRIPTION OF THE DRAWINGS

FIG. 1 is a schematic diagram depicting a system for the transmission of high speed signals (40/100 Gbps and above) using multiplexed orthogonal optical polarization, with 2 bits per symbol per polarization, for a total of 4 bits/symbol.

FIG. 3 is a diagram depicting an exemplary calibration signal embedded in a multichannel preamble header, as detected by the correlators.

DETAILED DESCRIPTION

Figure 2:
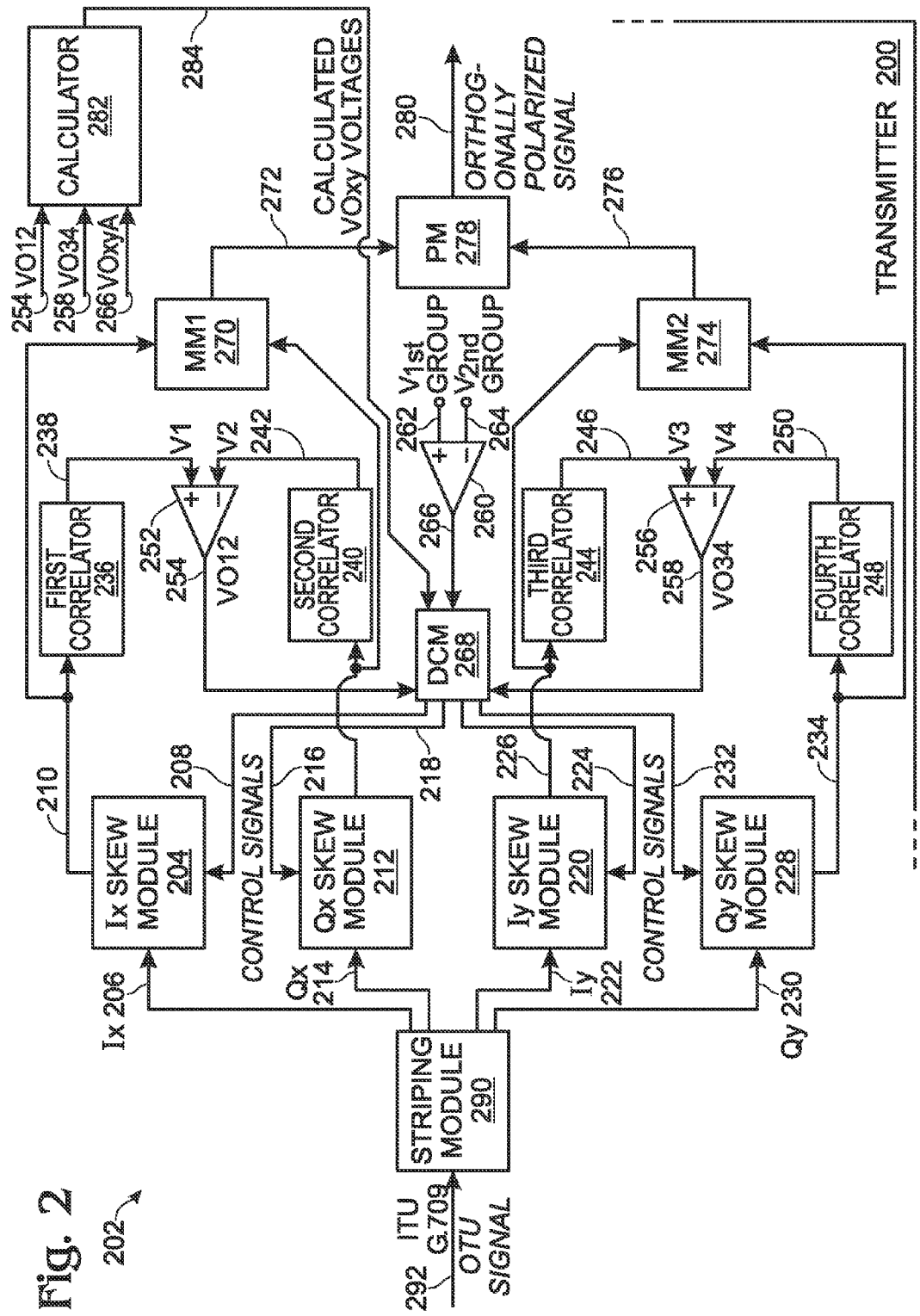
FIG. 2 is a schematic block diagram of a system for calibrating skew in a multichannel optical transport network (OTN) transmission device.

FIG. 2 is a schematic block diagram of a system for calibrating skew in a multichannel optical transport network (OTN) transmission device 200. The system 202 comprises an Ix skew module 204 having an input on line 206 to accept an Ix signal from a pair of $2^n$-phase shift keying ($2^n$PSK) modulated signals, where n>1. In one aspect, n=2. However, the system is not limited to any particular value of n. The Ix skew module 204 has a control port on line 208 and an output on line 210 to supply the Ix signal delayed in time in response to signals received at the control port. A Qx skew module 212 has an input on line 214 to accept a Qx signal from the pair of $2^n$PSK modulated signals. The Qx skew module 212 has a control port on line 216 and an output on line 218 to supply the Qx signal delayed in time in response to signals received at the control port.

An Iy skew module 220 has an input on line 222 to accept an Iy signal from a pair of $2^p$-PSK modulated signals, where p>1. In one aspect, p=2. However, the system is not limited to any particular value of p. Typically, n=p. The Iy skew module 220 has a control port on line 224 and an output on line 226 to supply the Iy signal delayed in time in response to signals received at the control port. A Qy skew module 228 has an input on line 230 to accept a Qy signal from the pair of 2PPSK modulated signals. The Qy skew module 228 has a control port on line 232 and an output on line 234 to supply the Qy signal delayed in time in response to signals received at the control port.

A first correlator 236 has an input on line to accept the Ix signal and an output to supply a correlated Ix signal (V1) on line 238, correlated to a predetermined preamble/header section of an OTN frame. The preamble/header includes a predetermined calibration signal. Knowing the value of the predetermined calibration signal, the correlator 236 may modify the frequency response, Q (bandwidth), or gain of the Ix signal, to optimize the correlated Ix signal on line 238. A second correlator 240 has an input on line 218 to accept the Qx signal and an output on line 242 to supply a correlated Qx signal (V2), correlated to the predetermined preamble section of the OTN frame.

A third correlator 244 has an input on line 226 to accept the Iy signal and an output to supply a correlated Iy signal (V3) on line 246, correlated to the preamble section of the OTN frame. A fourth correlator 248 has an input on line 234 to accept the Qy signal and an output on line 250 to supply a correlated Qy signal (V4), correlated to the preamble section of the OTN frame (V4).

A first comparator 252 has inputs on lines 238 and 242, respectively, to accept V1 and V2, and an output on line 254 to supply a VO12 voltage generated in response to the comparison. A second comparator 256 has inputs on lines 246 and 250, respectively, to accept V3 and V4, and an output on line 258 to supply a VO34 voltage generated in response to the comparison. A third comparator 260 has an input on line 262 to accept a first group voltage (either V1 or V2), an input on line 264 to accept a second group voltage (either V3 or V4), and an output on line 266 to supply a VOxy (VOxyA) voltage generated in response to the comparison.

A delay control module (DCM) 268 has an input on lines 254, 258, and 266 to accept the generated VO voltages and an output on lines 208, 216, 224, and 232 to supply signals to the respective Ix, Qx, Iy, and Qy skew module control ports. The delay control module 268 minimizes the VO voltages by adjusting time delay modules in the Ix, Qx, Iy, and Qy skew modules. Alternately stated, the skew or differential time delay between channels is calibrated by minimizing the VO voltages.

Typically, the third comparator 260 compares the voltage on the first group signal path with the voltage on the second group signal path subsequent to the delay control module 268 minimizing the VO12 and VO34 voltages.

A first modulation module (MM1) 270 (e.g., a Mach-Zehnder modulator (MZM)) accepts the delayed Ix and Qx signals on lines 210 and 218, respectively, and an output on line 272 to supplies a 2″PSK optical signal. A second modulation module (MM2) 274 accepts the delayed Iy and Qy signals on lines 226 and 234, respectively, and supplies a 2PPSK optical signal on line 276. A polarization multiplexer 278 has inputs on lines 272 and 276 to accept the 2″PSK and 2PPSK optical signals, respectively, and an output on line 280 to supply orthogonally polarized 2″PSK and 2PPSK optical signals for transmission.

As shown in this example, the first comparator 252 accepts V1 at a positive voltage comparator node and V2 at a negative voltage comparator node. The second comparator 256 accepts V3 at a positive voltage comparator node and V4 at a negative voltage comparator node. The third comparator 260 accepts the first group voltage at a positive voltage comparator node and the second group voltage at a negative voltage comparator node.

FIG. 3 is a diagram depicting an exemplary calibration signal embedded in a multichannel preamble header, as detected by the correlators. To continue the example started in FIG. 2, the first, second, third, and fourth correlators correlate the Ix, Qx, Iy, and Qy signals, respectively, to a preamble/header portion of the OTN frame representing a common logic value for each of the Ix, Qx, Iy, and Qy signals. That is, the example assumes that the calibration signal is a "0" for all channels, or a "1" for all channels. A logic "1" may be represented by a high voltage on lines 210, 218, 226, and 234, while a logic "0" may be represented by a low voltage. In other aspects not shown, the calibration signal may be cover multiple symbol periods.

In other aspects not shown, some or all of the comparator nodes may be reversed. That is, V1 may be connected to the negative node of comparator 252, while V2 is connected to the positive node. In another aspect not shown, the calibration signal and comparators may be alternately configured. For example, the V1 calibration signal may be a logic "1" and the V2 calibration signal may be a logic "0". In this scenario, V1 and V2 would both be connected to positive nodes (or both be connected to negative nodes) of a comparator.

To continue the example, the delay control module 268 minimizes the generated VO voltages for each voltage VOmn as follows In response to a positive VOmn value (e.g., VO12), the DCM 268 increases the delay in the m signal path, decreases the delay in the n signal path, or a combination of the above-mentioned operations. In the case of VO12, the m path would be associated with V1 (Ix), and the n path would be associated with V2 (Qx). Alternately, in response to a negative VOmn value, the delay control module 268 decreases the delay in an m signal path, increases the delay in an n signal path, or a combination of the above-mentioned operations. Again, this example assumes that VO1, VO2, VO3, and VO4 are connected to the comparators as shown in FIG. 2, and that a common logic value (either a "1" or a "0") is used in the calibration signal.

In other aspects, the system further comprises a calculator 282. The calculator 282 has inputs on lines 254, 258, and 266 to accept the respective VO12, VO34, and VOxyA voltages, and an output on line 284 to supply three remaining unique calculated VOxy voltages (VOxyB, VOxyC, and VOxyD) associated with comparing a voltage from the first group with a voltage from the second group. These calculated voltages are accepted by the delay control module 268, which then adjusts the time delay in the Ix, Qx, Iy, and Qy skew modules by minimizing the generated and calculated VO voltages.

As an example, if the third comparator 260 accepts V1 and V3, and generates VOxyA=VO13, then the calculator 282 calculates the three remaining VOxy voltages as follows:

$$VOxyB = VO23 = VO13 - VO12;$$

$$VOxyC = VO14 = VO34 - VO13; \text{ and,}$$

$$VOxyD = VO24 = VO14 - VO12.$$

Alternately but not shown, the system may include three additional comparators, so that the three remaining VOxy (VOxyB, VOxyC, and VOxyD) are generated (measured) instead of calculated.

Typically, the system 202 further comprises a striping module 290 that accepts an ITU G.709 OTN signal on line 292. Striping module 290 performs multiplex processing to provide four parallel paths carrying the 2″PSK and 2PPSK electrical signals on lines 206, 214, 222, and 230. Note: although four paths are shown for simplicity, the system 202 is not necessarily limited to just four paths. In the system shown, deskewing operations are performed between the modulation and polarization functions. In other aspects not shown, deskewing calibrations may be performed prior to modulation, or both before and after modulation of the electronic signals. The serial OTN signal on line 292 is typically a pseudo-random signal (e.g., a NRZ signal) with an average voltage about equal to the midpoint between the signal logic high and logic low values.

Functional Description

Figure 4:
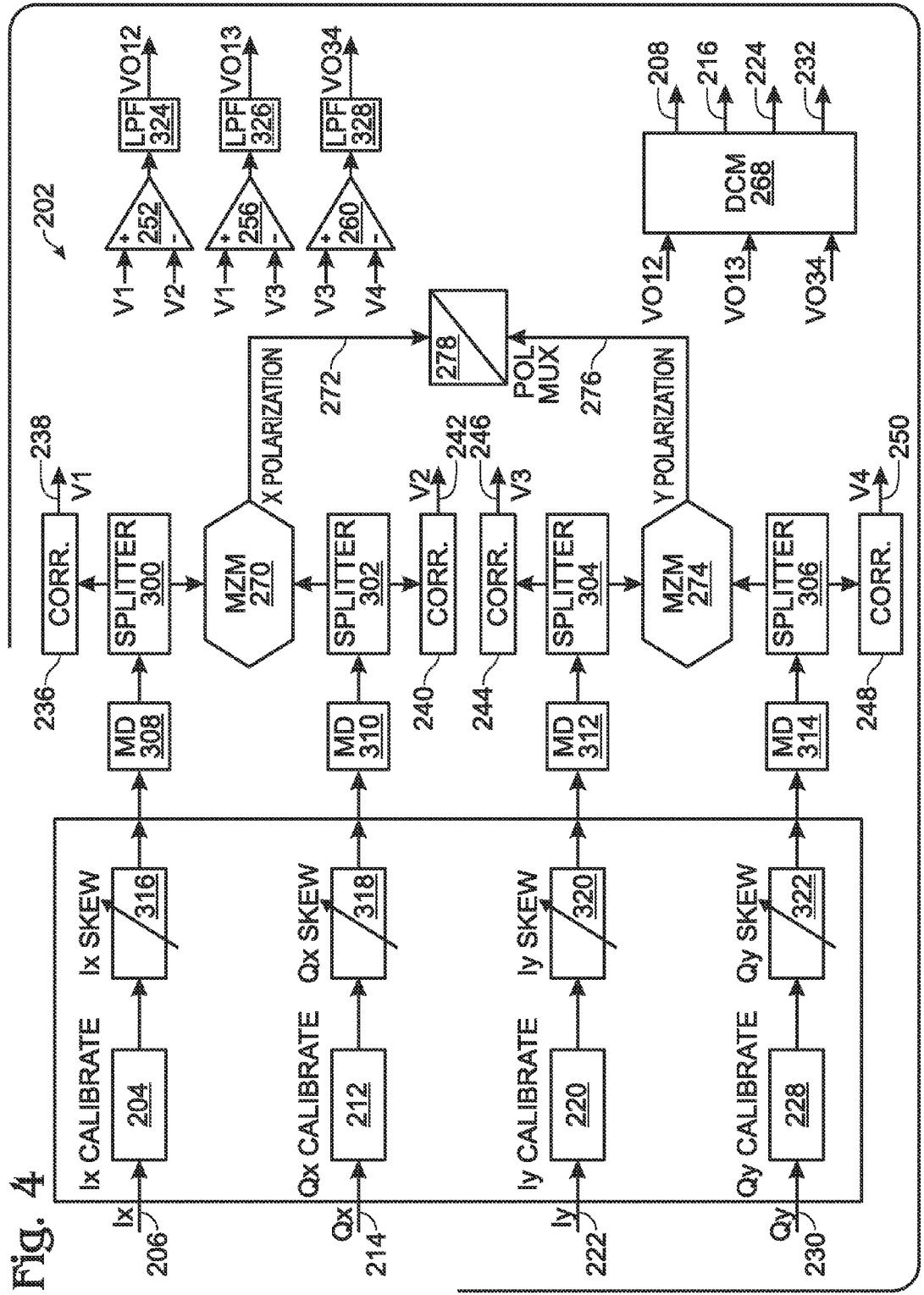
FIG. 4 is a schematic block diagram showing aspects of the system of FIG. 2.

FIG. 4 is a schematic block diagram showing aspects of the system of FIG. 2. The skew control is additionally enabled through the use of splitters 300, 302, 304, and 306. Also shown are modulation drivers (MDs) 308, 310, 312, and 314. Boxes 316, 318, 320, and 322 represent time delay in the respective channels Ix, Qx, Iy, and Qy.

By utilizing known patterns in the OTN frame structure, such as in the frame alignment signal (FAS), it is possible to correlate against expected patterns. First, the skew between I and Q channels for each polarization is adjusted by driving the MD signal difference between each set of I and Q channels to zero. Once this is achieved, i.e. when V1-V2~0 and V3-V4~0, then the VOxyA (VO13) output is driven to zero by adjusting both channel signals (I and Q) for one of the polarizations, in the same direction by the same amount. Due to limited range of available skew for a given channel, achieving the desired result may require adjusting both elements in opposite directions. In the case of VO12, Ix and Qx may be moved in opposite directions for example.

This accuracy of this method is enhanced due to correlation gain. For an 8-bit FAS per channel, the gain is about 9 dB. For a typical OTN frame, the adjustments are performed every 16320 bytes.

Figure 5:
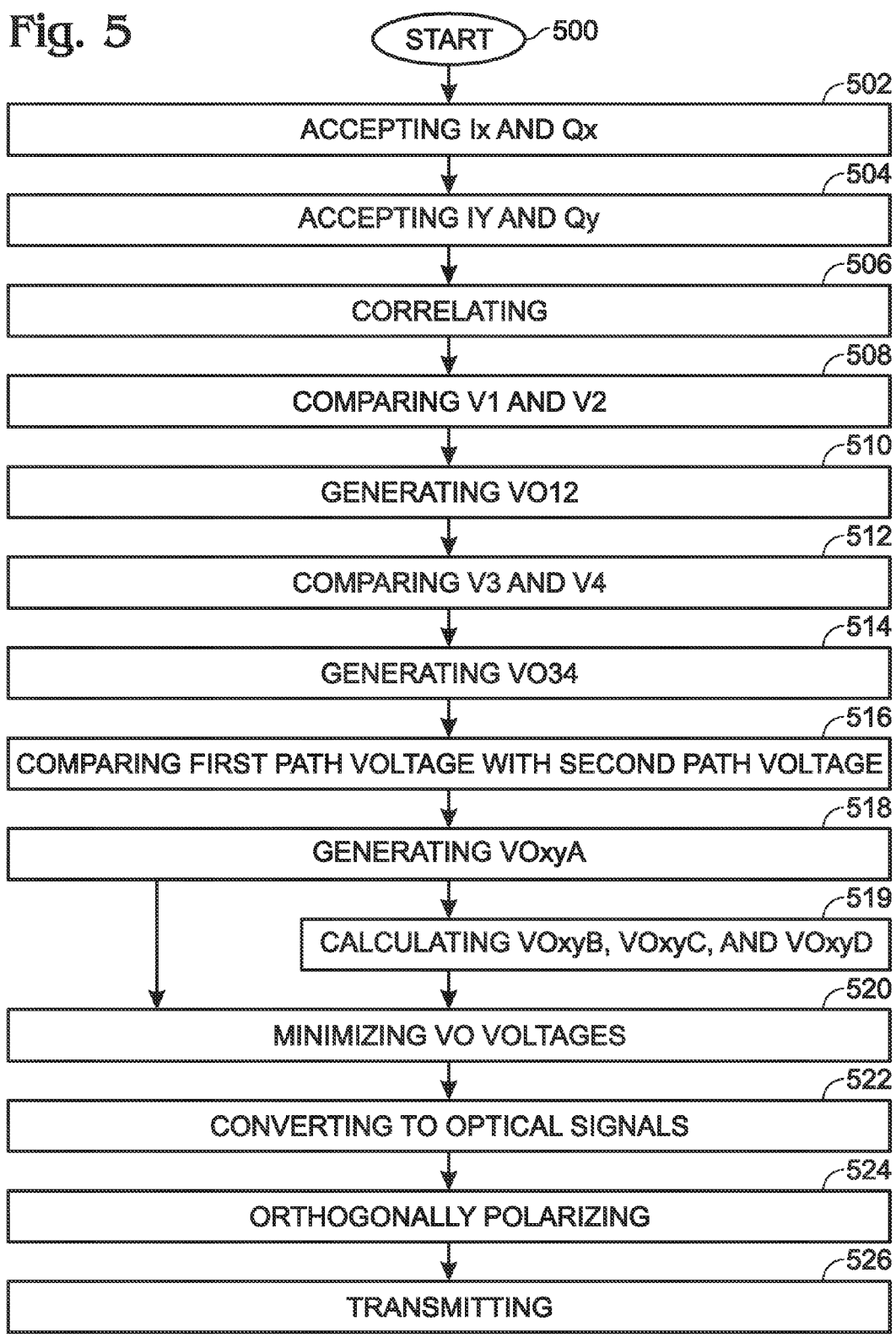
FIG. 5 is a flowchart illustrating a method for calibrating skew in a multichannel OTN transmission device.

FIG. 5 is a flowchart illustrating a method for calibrating skew in a multichannel OTN transmission device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 accepts a pair of $2^n$-phase shift keying ($2^n$PSK) modulated signals via Ix and Qx electrical signal paths, where n>1. Step 504 accepts a pair of $2^p$-PSK modulated signals via Iy and Qy electrical signal paths where p>1. Step 506 correlates the Ix, Qx, Iy, and Qy signals to a predetermined preamble/header portion of an OTN frame. Step 508 compares a voltage V1 on the Ix signal path with a voltage V2 on the Qx signal path. Step 510 generates a VO12 voltage in response to the comparison. Step 512 compares a voltage V3 on the Iy signal path with a voltage V4 on the Qy signal path. Step 514 generates a VO34 voltage in response to the comparison.

Step 516 compares a first signal path voltage (Ix or Qx) with a second signal path voltage (Iy or Qy). Step 518 generating a first VOxy (VOxyA) voltage in response to the comparison. Step 520 minimizes the generated VO voltages in response to adjusting time delay modules in the Ix, Qx, Iy, and Qy signals paths. Typically, Steps 516 and 518 are performed subsequent to minimizing the VO12 and VO34 voltages in Step 520.

Step 522 converts the $2^n$PSK and 2PPSK signals to $2^n$PSK and 2PPSK optical signals. Step 524 orthogonally polarizes the $2^n$PSK and 2PPSK optical signals. Step 526 transmits the orthogonally polarized signals.

In one aspect, comparing V1 to V2 (Step 508) includes providing the V1 voltage to a positive node of a voltage comparator device, and providing the V2 voltage to a negative node of a voltage comparator device. Likewise, comparing V3 to V4 (Step 512) includes providing the V3 voltage to a positive node of a voltage comparator device, and providing the V4 voltage to a negative node of a voltage comparator device. Comparing the first group voltage with the second group voltage in Step 516 includes providing the voltage from the first group to a positive node of a voltage comparator device, and providing the voltage from the second group to a negative node of a voltage comparator device.

Generally, the generated VO voltages are minimized, for any particular VOmn value as follows. In response to a positive VOmn value, Step 520 increases the delay in an m signal path, decreases the delay in an n signal path, or a combination of the above-mentioned operations. In response to a negative VOmn value, Step 520 decreases the delay in an m signal path, increases the delay in an n signal path, or a combination of the above-mentioned operations.

In one aspect, correlating the Ix, Qx, Iy, and Qy signals to the preamble/header portion of the OTN frame in Step 506 includes correlating the Ix, Qx, Iy, and Qy signals to a preamble header portion representing a common logic value for each of the Ix, Qx, Iy, and Qy signals.

In another aspect, Step 519 calculates three remaining unique VOxy voltages (VOxyB, VOxyC, and VOxyD) associated with comparing a voltage from the first group with a voltage from the second group, using the generated VO12, VO34, and VOxyA voltages. Then, Step 520 includes minimizing the generated and calculated VO voltages in response to adjusting the time delay modules in the Ix, Qx, Iy, and Qy signal paths.

For example, if the VOxyA voltage generated in Step 518 is VO13, then Step 519 calculates the three remaining VOxy voltages as follows:

$$VOxyB=VO23=VO13-VO12;$$

$$VOxyC=VO14=VO34-VO13;\text{ and,}$$

$$VOxyD=VO24=VO14-VO12.$$

A system and method have been provided for controlling time delay in a multichannel optical transport network (OTN) transmission device using a calibration signal in the preamble/header of the OTN frame. Explicit circuit details and process steps have been given as examples to illustrate the invention. However, the invention is not necessarily limited to these examples. Other variations and embodiments of the invention will occur to those skilled in the art.

We claim:

1. A method for calibrating skew in a multichannel optical transport network (OTN) transmission device, the method comprising:

accepting a pair of $2^n$-phase shift keying ($2^n$PSK) modulated signals via Ix and Qx electrical signal paths, where n>1;

accepting a pair of $2^p$-PSK modulated signals via Iy and Qy electrical signal paths where p>1;

correlating the Ix, Qx, Iy, and Qy signals to a predetermined preamble/header portion of an OTN frame;

comparing a voltage V1 on the Ix signal path with a voltage V2 on the Qx signal path;

generating a VO12 voltage in response to the comparison;

comparing a voltage V3 on the Iy signal path with a voltage V4 on the Qy signal path;

generating a VO34 voltage in response to the comparison;

comparing a voltage on a signal path selected from a first group consisting of Ix and Qx with a voltage selected from a second group consisting of Iy and Qy;

generating a first VOxy (VOxyA) voltage in response to the comparison; and, minimizing the generated VO voltages in response to adjusting time delay modules in the Ix, Qx, Iy, and Qy signals paths.

2. The method of claim 1 further comprising:

converting the $2^n$PSK and 2PPSK signals to $2^n$PSK and 2PPSK optical signals;

orthogonally polarizing the $2^n$PSK and 2PPSK optical signals; and, transmitting the orthogonally polarized signals.

3. The method of claim 1 wherein comparing V1 to V2 includes:

providing the V1 voltage to a positive node of a voltage comparator device;

providing the V2 voltage to a negative node of a voltage comparator device;

wherein comparing V3 to V4 includes:

providing the V3 voltage to a positive node of a voltage comparator device;

providing the V4 voltage to a negative node of a voltage comparator device;

wherein comparing the voltage from the first group with the voltage from the second group includes:

providing the voltage from the first group to a positive node of a voltage comparator device; and, providing the voltage from the second group to a negative node of a voltage comparator device.

4. The method of claim 3 wherein minimizing the generated VO voltages includes, for VOmn:

in response to a positive VOmn value performing an operation selected from a group consisting of increasing the delay in an m signal path, decreasing the delay in an n signal path, and a combination of the above-mentioned operations; and, in response to a negative VOmn value performing an operation selected from a group consisting of decreasing the delay in an m signal path, increasing the delay in an n signal path, and a combination of the above-mentioned operations.

5. The method of claim 3 wherein correlating the Ix, Qx, Iy, and Qy signals to the preamble/header portion of the OTN frame includes correlating the Ix, Qx, Iy, and Qy signals to a preamble header portion representing a common logic value for each of the Ix, Qx, Iy, and Qy signals.

6. The method of claim 1 further comprising:

from VO12, VO34, and VOxyA, calculating three remaining unique VOxy voltages (VOxyB, VOxyC, and VOxyD) associated with comparing a voltage from the first group with a voltage from the second group; and, wherein minimizing the generated VO voltages in response to adjusting time delay modules in the Ix, Qx, Iy, and Qy signals paths includes minimizing the generated and calculated VO voltages in response to adjusting the time delay modules in the Ix, Qx, Iy, and Qy signal paths.

7. The method of claim 6 wherein generating VOxyA includes generating VO13; and, wherein calculating the three remaining VOxy voltages includes calculating:

$VOxyB = VO23 = VO13 - VO12;$ $VOxyC = VO14 = VO34 - VO13;$ and, $VOxyD = VO24 = VO14 - VO12.$ 8. The method of claim 1 wherein comparing the voltage on the first group signal path with the voltage on the second group signal path includes comparing the first and second group signal path voltages subsequent to minimizing the VO12 and VO34 voltages.

9. A system for calibrating skew in a multichannel optical transport network (OTN) transmission device, the system comprising:

an Ix skew module having an input to accept an Ix signal from a pair of $2^n$-phase shift keying ($2^n$PSK) modulated signals, where n>1, the Ix skew module having a control port and an output to supply the Ix signal delayed in time in response to signals received at the control port;

a Qx skew module having an input to accept an Qx signal from the pair of $2^n$PSK modulated signals, the Qx skew module having a control port and an output to supply the Qx signal delayed in time in response to signals received at the control port;

an Iy skew module having an input to accept an Iy signal from a pair of $2^p$-PSK modulated signals, where p>1, the Iy skew module having a control port and an output to supply the Iy signal delayed in time in response to signals received at the control port;

a Qy skew module having an input to accept an Qy signal from the pair of 2PPSK modulated signals, the Qy skew module having a control port and an output to supply the Qy signal delayed in time in response to signals received at the control port;

a first correlator having an input to accept the Ix signal and an output to supply a correlated Ix signal (V1), correlated to a predetermined preamble/header portion of an OTN frame;

a second correlator having an input to accept the Qx signal and an output to supply a correlated Qx signal (V2), correlated to the preamble/header portion of the OTN frame;

a third correlator having an input to accept the Iy signal and an output to supply a correlated Iy signal (V3), correlated to the preamble/header portion of the OTN frame (V3);

a fourth correlator having an input to accept the Qy signal and an output to supply a correlated Qy signal (V4), correlated to the preamble/header portion of the OTN frame (V4);

a first comparator having inputs to accept V1 and V2, and an output to supply a VO12 voltage generated in response to the comparison;

a second comparator having inputs to accept V3 and V4, and an output to supply a VO34 voltage generated in response to the comparison;

a third comparator having inputs to accept a voltage selected from a first group consisting of V1 and V2 and a voltage selected from a second group consisting of V3 and V4, and an output to supply a VOxy (VOxyA) voltage generated in response to the comparison; and, a delay control module having an input to accept the generated VO voltages and an output to supply signals to the Ix, Qx, Iy, and Qy skew module control ports, the delay control module minimizing the VO voltages by adjusting the time delay in the Ix, Qx, Iy, and Qy skew modules.

10. The system of claim 9 further comprising:

an first modulation module to accept the delayed Ix and Qx signals, and an output to supply a $2^n$PSK optical signal;

a second modulation module to accept the delayed Iy and Qy signals, and supply a 2PPSK optical signal; and, a polarization multiplexer having inputs to accepts the $2^n$PSK and 2PPSK optical signals and an output to supply orthogonally polarized $2^n$PSK and 2PPSK optical signals for transmission.

11. The system of claim 9 wherein the first comparator accepts V1 at a positive voltage comparator node and V2 at a negative voltage comparator node;

wherein the second comparator accepts V3 at a positive voltage comparator node and V4 at a negative voltage comparator node; and, wherein the third comparator accepts the voltage from the first group at a positive voltage comparator node and the voltage from the second group at a negative voltage comparator node.

12. The system of claim 11 wherein the delay control module minimizes the generated VO voltages for each voltage VOmn as follows:

in response to a positive VOmn value performing an operation selected from a group consisting of increasing the delay in an m signal path, decreasing the delay in an n signal path, and a combination of the above-mentioned operations; and, in response to a negative VOmn value performing an operation selected from a group consisting of decreasing the delay in an m signal path, increasing the delay in an n signal path, and a combination of the above-mentioned operations.

13. The system of claim 11 wherein the first, second, third, and fourth correlators correlate the Ix, Qx, Iy, and Qy signals, respectively, to a preamble/header portion of the OTN frame representing a common logic value for each of the Ix, Qx, Iy, and Qy signals.

14. The system of claim 9 further comprising:

a calculator having inputs to accept the VO12, VO34, and VOxyA voltages, and an output to supply three remaining unique calculated VOxy voltages (VOxyB, VOxyC, and VOxyD) associated with comparing a voltage from the first group with a voltage from the second group; and, wherein the delay control module adjusts the time delay in the Ix, Qx, Iy, and Qy skew modules by minimizing the generated and calculated VO voltages.

15. The system of claim 14 wherein the third comparator accepts V1 and V3, and generates VOxyA=VO13; and, wherein the calculator calculates the three remaining VOxy voltages as follows:

$VOxyB = VO23 = VO13 - VO12;$ $VOxyC = VO14 = VO34 - VO13;$ and, $VOxyD = VO24 = VO14 - VO12.$ 16. The system of claim 9 wherein the third comparator compares the voltage on the first group signal path with the voltage on the second group signal path subsequent to the delay control module minimizing the VO12 and VO34 voltages.

* * * * *

UNITED STATES PATENT AND TRADEMARK OFFICE
CERTIFICATE OF CORRECTION

| | | |
|---|---|---|
| PATENT NO. | : 7,965,946 B2 | Page 1 of 1 |
| APPLICATION NO. | : 12/169414 | |
| DATED | : June 21, 2011 | |
| INVENTOR(S) | : Keith Conroy et al. | |

It is certified that error appears in the above-identified patent and that said Letters Patent is hereby corrected as shown below:

The term should read "$2^P$PSK", in the following locations:

column 2, line 1;
column 2, line 2;
column 2, line 3;
column 3, line 40;
column 3, line 41;
column 5, line 46;
column 5, line 47;
column 5, line 48;
column 6, line 59 (claim 2);
column 6, line 60 (claim 2);
column 8, line 7 (claim 9);
column 8, line 48 (claim 10);
column 8, line 50 (claim 10);
column 8, line 51 (claim 10).

Signed and Sealed this
Tenth Day of April, 2012

David J. Kappos
*Director of the United States Patent and Trademark Office*